(12) United States Patent
Sapper

(10) Patent No.: US 6,309,710 B1
(45) Date of Patent: Oct. 30, 2001

(54) AQUEOUS LACQUER CONTAINING A MULTICOMPONENT AQUEOUS DISPERSION

(75) Inventor: Ekkehard Sapper, Rimpar (DE)

(73) Assignee: BASF Coatings AG, Muenster-Hiltrup (DE)

(*) Notice: Subject to any disclaimer, the term of this patent is extended or adjusted under 35 U.S.C. 154(b) by 0 days.

(21) Appl. No.: 09/462,859

(22) PCT Filed: Jul. 16, 1998

(86) PCT No.: PCT/EP98/04443
§ 371 Date: Jan. 13, 2000
§ 102(e) Date: Jan. 13, 2000

(87) PCT Pub. No.: WO99/03942
PCT Pub. Date: Jan. 28, 1999

(30) Foreign Application Priority Data

Jul. 18, 1997 (DE) .............................................. 197 30 889

(51) Int. Cl.⁷ ....................................................... B05D 1/36
(52) U.S. Cl. ............................................................ 427/407.1
(58) Field of Search .......................................... 427/407.1

(56) References Cited

U.S. PATENT DOCUMENTS

| | | | |
|---|---|---|---|
| 3,978,015 | 8/1976 | Kolish et al. | 260/29.4 |
| 4,939,213 | 7/1990 | Jacobs, III et al. | 525/329.9 |
| 5,840,372 * | 11/1998 | Rink et al. | 427/407.1 |
| 6,063,954 * | 5/2000 | Diener et al. | 560/26 |

FOREIGN PATENT DOCUMENTS

| | | |
|---|---|---|
| 38 03 522 A1 | 2/1988 | (DE) . |
| 43 22 242 A1 | 7/1993 | (DE) . |
| 43 32 015 A1 | 7/1993 | (DE) . |
| 43 42 551 A1 | 12/1993 | (DE) . |
| 0 038 127 A1 | 3/1981 | (EP) . |
| 0 239 850 A2 | 3/1987 | (EP) . |
| WO 87/03829 | 7/1987 | (EP) . |
| 0 565 774 A2 | 11/1992 | (EP) . |
| 604922 * | 7/1994 | (EP) . |
| 2 200 644 A | 8/1988 | (GB) . |

OTHER PUBLICATIONS

Blank et al, Book of Abstracts, 214th ACS National Meeting, 1997.*

* cited by examiner

Primary Examiner—Erma Cameron

(57) ABSTRACT

The invention relates to aqueous clearcoats comprising a multicomponent aqueous dispersion which comprises:

A) at least one aqueous dispersion of a hydroxyl-containing binder, and

B) a stable aqueous dispersion of a hydrophobic amino resin, said dispersion being prepared using a hydroxyl-containing emulsifier.

The hydrophobic amino resin in component B) is preferably a hydrophobic melamine resin and the hydroxyl-containing binder in component A) is preferably a hydroxyl-containing polyacrylate.

Further embraced by the invention are a method of applying multilayer coatings, in which the aqueous coating materials of the invention are used as topcoat, and substrates coated with such multilayer coatings.

27 Claims, No Drawings

AQUEOUS LACQUER CONTAINING A MULTICOMPONENT AQUEOUS DISPERSION

FIELD OF THE INVENTION

The invention relates to an aqueous coating material comprising a multicomponent aqueous dispersion consisting of at least one aqueous dispersion of a hydroxyl-containing binder and of an aqueous dispersion of a hydrophobicized amino resin, which latter dispersion is prepared using hydroxyl-containing emulsifiers.

PRIOR ART

Water based clearcoats are acquiring increasing importance in the sector of automotive OEM finishing and refinishing since they permit a marked reduction in the emission of organic solvents during the coating operation.

In general, the water based clearcoats comprise an aqueous dispersion or solution of a crosslinkable polymer as binder and one or more crosslinking agents, such as water miscible blocked isocyanates or water miscible melamine resins, and also further customary coating auxiliaries or additives, such as light stabilizers, thickeners or leveling agents, for example. DE-A-43 42 551, for example, describes aqueous polymer dispersions and aqueous coatings based on these polymer dispersions and comprising hydroxyl-containing polyacrylates as a binder component, which are particularly suitable for producing transparent coating films, especially topcoat films, which have high acid and scratch resistances.

DE-A-43 22 242 comprises aqueous two-component coating compositions comprising aqueous dispersions of polyacrylates as binder and polyisocyanates as crosslinking agent, which are likewise used, in particular, as topcoats, preferably in automotive refinishing, and which, in addition to the requirements imposed on an automotive refinish, exhibit good leveling, good mechanical properties, and high weathering stability.

DE-A-43 32 015 describes, finally, aqueous coating materials comprising mixtures of aqueous dispersions of polyurethane acrylate resins and aqueous dispersions of polyacrylate, polyurethane and/or polyester resins and also, if desired, crosslinking agents, such as amino resins and blocked polyisocyanates. Coating materials of this kind are suitable for producing topcoat films which, despite low baking temperatures, are distinguished by good properties of the resulting coating film.

DE-A-38 03 522 describes an aqueous coating composition comprising a water-dispersible acrylic polymer and a melamine resin, but which contains pigments as a mandatory component. The hydrophobic melamine resin is dispersed in water in the presence of a water soluble resin. The coating composition cannot be used as a clearcoat.

The water based clearcoat formulations of the prior art, however, have the problem of inadequate popping resistance and of the insufficient evaporation rate of the coating film, for which reason the use of such water based clearcoat formulations in OEM finishing necessitates special measures for gentle evaporation, which in turn reduce the cycle rate of production-line manufacture and, furthermore, necessitate high levels of capital investment.

Furthermore, two-component water based clearcoats consisting of a binder component and a crosslinker component often lack the necessary processing stability, something which is manifested, for example, in an unwanted increase in viscosity in the coating material, after the binder component and the crosslinker component have been mixed, as a result of reaction between the two components.

Problem and Solution

On the basis of the difficulties set out above, the resulting problem was to provide processing-stable aqueous coating materials which lead to coating films having excellent properties, such as, in particular, acid and scratch resistance, and also weathering stability, in conjunction with a rapid evaporation rate and a high level of popping resistance in the course of drying. This problem can surprisingly be solved with the multicomponent aqueous dispersion of the invention as a coating constituent.

The multicomponent aqueous dispersion of the invention, as a constituent of aqueous coating materials, comprises A) at least one aqueous dispersion of a hydroxyl-containing binder, and B) a stable aqueous dispersion of a hydrophobic amino resin, said dispersion being prepared using hydroxyl-containing emulsifiers.

In one preferred embodiment of the invention, the emulsifier used to prepare the stable aqueous dispersion of the hydrophobic amino resin is a diol and/or polyol having a molecular weight of at least 500 daltons, selected with particular preference from the group consisting of the polyacrylate-diols and/or -polyols, polyester-diols and/or -polyols and polyether-diols and/or -polyols, and also, with very particular preference, polyurethane-diols and/or -polyols, polycarbonate-diols and/or -polyols, and polyether-diols and/or -polyols.

In the case of the polyether-diols and/or -polyols, these can also be attached to the amino resin. For this purpose it is preferred to use block copolyether radicals consisting of ethylene oxide and propylene oxide units.

Preference is given as hydrophobic amino resin, furthermore, to a hydrophobic melamine resin, with particular preference obtained by etherification of a melamine-formaldehyde condensation product with C3 to C12 alcohols.

In addition to the crosslinker component B), the multicomponent aqueous dispersions of the invention preferably include at least one further crosslinking agent in aqueous dispersion, with particular preference a trisalkoxycarbonylaminotriazine in aqueous dispersion.

The hydroxyl-containing binder present in aqueous dispersion in component A) is preferably a polymer selected from the group of hydroxyl-containing polyesters, polyethers, alkyd resins and cellulose derivatives, and also, with particular preference, polyurethanes, polyacrylates and polyurethane acrylates.

The invention further provides a method of applying a multilayer coating to a substrate surface, in which the topcoat applied is an aqueous coating material comprising the multicomponent aqueous dispersion of the invention, and provides substrates coated with such multilayer coatings.

IMPLEMENTATION OF THE INVENTION

Components A) and B) of the Multicomponent Aqueous Dispersion

Component A) consists of at least one aqueous dispersion of a hydroxyl-containing binder, preferably a polyester, polyether, alkyd resin and/or cellulose derivative, with particular preference a hydroxyl-containing polyacrylate, polyurethane and/or polyurethane acrylate.

The particularly preferred polyacrylates, polyurethanes and polyurethane acrylates can be prepared, for example, in accordance with the above-cited Laid-Open Specifications DE-A-43 22 242, DE-A-43 32 015, and DE-A-43 42 551.

In accordance with the invention, the aqueous multicomponent dispersion comprises as component B) a stable aqueous dispersion of a hydrophobic amino resin, this dispersion being prepared by means of hydroxyl-containing emulsifiers.

The hydrophobic amino resins which are known per se are preferably condensation products of aldehydes, especially formaldehyde, and, for example, urea, guanamine, benzoguanamine, and preferably melamine. The hydrophobic amino resins contain alcohol groups, preferably methylol groups, which are etherified preferably with C3 to C12 alcohols, such as isopropanol, n-butanol, isobutanol, tert-butanol, amyl alcohol, 1-hexanol, 1-octanol, 2-ethylhexanol, 1-decanol, isodecanol, 1-dodecanol or isododecanol, for example.

Butanol-etherified melamine-formaldehyde resins are used in particular as hydrophobic amino resins.

The hydroxyl-containing emulsifiers used for the hydrophobic amino resins are preferably diols and/or polyols having emulsifying properties, with particular preference diols and/or polyols having a molecular weight of between 500 and 50,000 daltons; with very particular preference, having a molecular weight of between 500 and 10,000 daltons and, in particular, from 500 to 5000 daltons. The emulsifying diols and/or polyols are preferably selected from the group of the polyacrylate-diols and/or -polyols, polyester-diols and/or -polyols and polyether-diols and/or -polyols, and, with very particular preference, from the group of the polyurethane-diols and/or -polyols, polycarbonate-diols and/or -polyols, and polyether-diols and/or -polyols.

The ratio of hydrophilic to hydrophobic moieties in the diols and/or polyols is preferably established either by way of the molecular weight of the diols and/or polyols and the fraction of hydrophilic groups already present in the diol and/or polyol, or by the introduction of additional hydrophilic groups, such as acid groups or salts thereof, examples being carboxyl or carboxylate groups, sulfonic acid or sulfonate groups, and phosphonic acid or phosphonate groups.

Particularly preferred polyether-diols and/or -polyols are block copolyethers consisting of ethylene oxide and propylene oxide units, the proportion of ethylene oxide units being from 30 to 50% and the proportion of propylene oxide units being from 50 to 70% by weight. The molecular weight is preferably around 9000 daltons. Emulsifiers of this kind are sold, for example, by BASF AG under the trade name Pluronic® PE 9400.

The polyether-diols and/or -polyols, especially those of the type described above, can also be attached to the hydrophobic amino resins. Preferably, the hydrophobic amino resin contains the polyether-diol and/or -polyol radicals in an amount of from 1 to 4, in particular from 1.8 to 2.5, % by weight, based on the amino resin and emulsifier radicals. Products of this kind are sold by BASF AG under the trade name Luwipal® LR 8984.

Further crosslinking agents which may be present in the multicomponent aqueous dispersion of the invention in addition to the hydrophobic amino resins are all crosslinking agents which are suitable for the crosslinking of hydroxyl-containing binders, preferably in aqueous dispersion, provided they do not impair the dispersion nature of the multicomponent aqueous dispersion.

As further crosslinking agent, preference is given to trisalkoxycarbonylaminotriazines, as are described, for example, in U.S. Pat. No. 4,939,213 or in EP-A-0 565 774, preferably in aqueous dispersion. Very particular preference is given in this context to trisalkoxycarbonylaminotriazines whose alkoxy groups are lower alkoxy groups, preferably methoxy and/or butoxy groups.

Further suitable crosslinking agents are blocked and/or unblocked polyisocyanates. Whose isocyanate groups are attached preferably to aliphatic or cycloaliphatic radicals. Examples of such polyisocyanates are hexamethylene diisocyanate, isophorone diisocyanate, trimethylhexamethylene diisocyanate, dicyclohexylmethane diisocyanate, 1,3-bis(2-isocyanatoprop-2-yl)benzene, and also adducts of these polyisocyanates with polyols, especially low molecular mass polyols, such as trimethylolpropane, for example, and also polyisocyanates which are derived from these polyisocyanates and which contain isocyanurate groups and/or biuret groups, containing preferably more than two isocyanate groups in the molecule. The polyisocyanates can be blocked using any blocking agent which is known to the skilled worker and has a sufficiently low deblocking temperature.

Aqueous Coating Materials Comprising the Multicomponent Aqueous Dispersions of the Invention, and the Application of the Aqueous Coating Materials Aqueous coating materials comprising the aqueous coating dispersions of the invention can contain in addition to the hydroxyl-containing binders described above, preferably in proportions of up 75% by weight, based on the binder, further binder constituents having low hydroxyl group contents or being free from hydroxyl groups, in aqueous dispersion, examples being water dispersible polyester resins, water dispersible polyacrylate resins, water dispersible polyurethane resins, water dispersible alkyd resins, water dispersible cellulose derivatives, and water dispersible polyether resins.

In addition, the aqueous coating materials of the invention may also contain crosslinked polymeric microparticles (compare for example EP-A-0 038 127) and/or customary organic or inorganic rheology control additives. Examples of effective thickeners are sheet silicates, water soluble cellulose ethers, and synthetic polymers having ionic or associative groups, such as polyvinyl alcohol, polyamides, poly(meth)acrylamide, poly(meth)acrylic acid, polyvinylpyrrolidone, or hydrophobically modified ethoxylated urethanes or polyacrylates.

If desired, the aqueous coating materials of the invention additionally comprise further auxiliaries and/or additives, such as, for example, catalysts for the crosslinking reaction, defoamers, dispersion auxiliaries, wetting agents, preferably carboxy-functional dispersants which differ from the above-mentioned emulsifiers, antioxidants, UV absorbers, free-radical scavengers, leveling assistants, and/or biocides.

In addition, the aqueous coating materials of the invention may contain organic solvents in amounts of up to 15% by weight. Examples of suitable organic solvents are naphthalenes, petroleum spirits or alcohols, preferably low molecular mass diols, such as alkylene glycols or dimethylolcyclohexane, for example.

As a further component the aqueous coating materials of the invention may contain film forming auxiliaries, such as dialkyl dicarboxylates, for example, or high-boiling petroleum spirits or naphthalenes, having a boiling point of more than 100 degrees C., preferably more than 140 degrees C.

The aqueous coating materials of the invention can be used in both the OEM finishing and the refinishing of car bodies: for example, as surfacers, as single-coat finish systems, as pigmented basecoats or, preferably, as clearcoats.

If the aqueous coating materials of the invention are used to produce single-coat finish systems or as basecoats, then they can contain any of the organic or inorganic pigments suitable for aqueous coating materials, or mixtures of such pigments. Examples of pigments which can be used are titanium dioxide, iron oxide, carbon black, metal pigments, especially aluminum pigments, and pearl luster pigments and interference pigments.

It is also possible for anticorrosion pigments, such as zinc phosphate, to be present.

Further preference is given in accordance with the invention to a method of applying multilayer coatings using aqueous coating materials comprising the multicomponent aqueous dispersions of the invention as topcoats DL, said method being subdivided into the following stages:

(1): applying an aqueous basecoat BL to the substrate surface, (2): forming a polymer film from the aqueous basecoat BL applied in stage (1), (3): applying an aqueous transparent topcoat DL comprising the multicomponent aqueous dispersion of the invention to the basecoat film obtained in accordance with stage (2), and finally (4): baking the basecoat film and the topcoat film together.

The basecoat film applied in stage (1) is left to evaporate, preferably at elevated temperature, in order to form the polymer film in accordance with stage (2), before the application of the topcoat DL of the invention in stage (3), the duration of evaporation depending on the temperature and being adjustable over wide ranges. For example, at temperatures of from 60 to 100 degrees C., preferably from 70 to 85 degrees C., evaporation times of from 1 to 15 minutes, preferably from 4 to 10 minutes, are chosen.

The basecoat BL and topcoat DL are applied in accordance with customary methods which are known in the prior art. The dry film thickness of the basecoat film is between 10 and 40 $\mu$m, preferably between 12 and 25 $\mu$m, and the dry film thickness of the topcoat film is between 20 and 60 $\mu$m, preferably between 35 and 45 $\mu$m. Following the application of the topcoat DL of the invention in stage (3) and before the baking step in stage (4), the basecoat film and the topcoat film are dried, preferably at room temperature, for a period of from 2 to 10 minutes, preferably from 4 to 6 minutes.

The baking of the basecoat film and of the topcoat film in one stage takes place in suitable apparatus known from the prior art, preferably at temperatures between 120 and 160 degrees C., with particular preference between 130 and 150 degrees C., for a period of preferably from 10 to 30 minutes, with particular preference from 15 to 25 minutes.

The present invention additionally provides a multilayer-coated substrate, the coating being applied to the substrate surface by (1): applying an aqueous basecoat BL to the substrate surface, (2): allowing the basecoat BL to evaporate in order to form a polymer film from the basecoat BL applied in stage (1), (3): thereafter, applying an aqueous transparent topcoat DL to the basecoat film obtained in accordance with stage (2), and finally (4): baking the basecoat film and the topcoat film together, wherein the topcoat DL comprises the multicomponent aqueous dispersion of the invention.

Suitable substrates for coating are, in particular, pretreated metal substrates; however, it is also possible to coat non-pretreated metals or any other substrates, such as wood or plastics, for example, with a multilayer protective and/or decorative coating using the basecoats of the invention.

The invention is illustrated using the following examples. All parts and percentages therein are by weight, unless expressly stated otherwise.

EXAMPLES

Example 1

Preparation of an Aqueous Dispersion A1) of a Hydroxyl-containing Binder

A steel vessel equipped with monomer feed facility, initiator feed facility, thermometer, oil heating and a reflux condenser is charged with 8.08 parts of methoxypropanol and 8.88 parts of butyldiglycol and this initial charge is heated to 120 degrees C.

Then a solution of 7.95 parts of t-butyl perethylhexanoate in 11.09 parts of methoxypropanol is added at a rate such that the addition is over after 4.5 hours. Simultaneously with the beginning of the addition of the t-butyl perethylhexanoate solution, the addition is commenced of a mixture of:

0.96 part of glycidyl methacrylate 19.64 parts of butyl acrylate 5.47 parts of butyl methacrylate 9.95 parts of cyclohexyl methacrylate 4.90 parts of styrene 21.32 parts of hydroxypropyl methacrylate 1.76 parts of acrylic acid the monomer mixture being added at a rate such that the addition is over after 4 hours. When the addition of the t-butyl perethylhexanoate solution is over, the reaction mixture is held at 120 degrees C. for 2 hours more. Then the resin solution is cooled to 80 degrees C. and is neutralized over the course of 30 minutes, using dimethylethanolamine, to a degree of neutralization of 80%. Subsequently, water is added until the solids content of the dispersion is approximately 40%. The organic solvent is removed from this dispersion by azeotropic distillation under reduced pressure until not more than 3% can be detected by gas chromatography. After the end of the distillation, the dispersion is adjusted to a solids content of 38% by adding deionized water.

Example 2

Preparation of the Aqueous Clearcoats of the Invention KL1, KL2 and KL3

Example 2.1

Preparation of the Clearcoat KL1

60.40 parts of the aqueous dispersion A1) according to Example 1 are mixed intensively with 28.00 parts of the aqueous dispersion of the hydrophobic melamine resin B1) [361.5 parts of Luwipal® 8792 from BASF AG, 10.2 parts of Pluronic® PE 9400 from BASF AG (block copolyether comprising 40% ethylene oxide units and 60% propylene oxide units, with a molecular weight of approximately 9000 daltons, as emulsifier)] and 128.3 parts of a buffer solution consisting of 1.47 parts of triethanolamine, 0.45 parts of 100% strength formic acid and 126.4 parts of deionized water, 2.00 parts by weight of butyldiglycol, 0.15 part by weight of a leveling assistant (Tego Flow® 425 from Goldschmidt AG), 0.03 part by weight of a silicone-based surfactant (BYK® 331 from Byk Gulden), and 9.42 parts by weight of deionized water. This gives the clearcoat KL1 of the invention.

Example 2.2

Preparation of the Clearcoat KL2

60.40 parts by weight of the aqueous dispersion A1) according to Example 1 are mixed intensively with 28.00 parts by weight of a mixture B2) of 15.00 parts by weight of an aqueous dispersion of a hydrophobic melamine resin B1) according to Example 2.1 and 13.00 Darts by weight of an aqueous 50% dispersion of trisalkoxycarbonylaminotriazine B2) (alkoxy groups: butoxy groups and methoxy groups in an average ratio of 2:1), 2.00 parts by weight of butyldiglycol, 0.15 part by weight of a leveling assistant (Tego Flow® 425 from Goldschmidt AG), 0.03 part by weight of a silicone-based surfactant (BYK® 331 from Byk Gulden), and 9.42 parts by weight of deionized water. This gives the clearcoat KL2 of the invention.

Example 2.3

Preparation of the Clearcoat KL3

Example 2.1 is repeated, but replacing the Luwipal® 8792 and Pluronic® PE 9400 (both from BASF AG) with 28.0 parts of Luwipal® LR 8984 from BASF AG. Luwipal® LR 8984 is a butanol-etherified melamine resin (Luwipal® 018 from BASF AG) containing 2.2% by weight of Pluronic® PE 9400 in chemically bonded form. The resulting clearcoat KL3 is found to be filterable by ultrafiltration.

Example 3

Preparation of a Clearcoat KV1 Without the Component B) of the Invention (Comparative)

60.40 parts by weight of the aqueous dispersion A1) according to Example 1 are mixed intensively with a mixture of 5.20 parts by weight of melamine resin (Cymel® 202 from American Cyanamid), 2.90 parts by weight of a solution of blocked hexamethylene diisocyanate (containing 1.079 parts of Basonat® HI 100 and 0.305 parts of diethyl malonate) and 12.90 parts by weight of a solution of blocked isophorone diisocyanate (containing 3.296 parts by weight of Vestanat T1890 and 0.712 part of diethyl malonate) as crosslinker components, 4.50 parts by weight of butyldiglycol, 0.15 part by weight of a leveling assistant (Tego Flow® 425 from Goldschmidt AG), 0.03 part by weight of a silicone-based surfactant (BYK® 331 from Byk Gulden), and 14.52 parts by weight of deionized water. This gives the clearcoat KV1. It is found to be not filterable by ultrafiltration.

Example 4

Application of the Clearcoats KL1 and KL2 of the Invention and, Respectively, of the Comparative Clearcoat KV1 as Topcoats, and Testing of the Baked Coating Films An aqueous basecoat BL pigmented with aluminum flakes is applied in accordance with EP-A-0 279 813 to a phosphated steel panel coated with a commercially customary electrodeposition coating system and a commercially customary surfacer so as to give a dry film coat thickness of from 12 to 15 micrometers. The applied basecoat BL is dried at room temperature for 10 minutes and at 60 degrees C. for 10 minutes. Thereafter, the clearcoat KL1, KL2 or KV1 prepared in accordance with Examples 2 or 3 (Comparative Example) as topcoat DL is sprayed onto the basecoat film in two cross passes with a flash-off time of 15 minutes in between. Finally, the coating system is dried at room temperature for 30 minutes, predried at 80 degrees C. for 10 minutes, and finally baked in a circulating-air oven at 145 degrees C. for 30 minutes. The clearcoat films obtained in this way from the clearcoats KL1, KL2 and KL3 of the invention exhibit no popping marks or pinholes at coat thicknesses of 40 $\mu$m, the popping limit being situated at about 55 $\mu$m. A coat with the clearcoat KV1 according to the Comparative Example shows slight popping marks and pinholes at a coat thickness of 40 $\mu$m.

What is claimed is:

1. An aqueous clearcoat comprising a multicomponent aqueous dispersion comprising:
   A) at least one aqueous dispersion of a hydroxyl-containing binder, and
   B) an aqueous dispersion of a hydrophobic amino resin, where said dispersion is prepared using a hydroxyl-containing emulsifier.

2. The aqueous coating material as claimed in claim 1, wherein said hydroxyl-containing emulsifier is a compound selected from the group consisting of diols, polyols and mixtures thereof.

3. The aqueous coating material as claimed in claim 2, wherein said hydroxyl-containing emulsifier is selected from the group consisting of diols and polyols and mixtures thereof having a molecular weight of at least 500 daltons.

4. The aqueous coating material as claimed in claim 2, wherein said hydroxyl-containing emulsifier is selected from the group consisting of polyurethane-diols, polyurethane-polyols, polyacrylate-diols, polyacrylate-polyols, polyester-diols, polyester-polyols, polyether-diols, polyether-polyols, and mixtures thereof.

5. The aqueous coating material as claimed in claim 1, wherein the hydroxyl-containing emulsifier is selected from the group consisting of a polyurethane-diol, polyurethane-polyol, a polycarbonate-diol, polycarbonate-polyol, a polyether-diol, polyether-polyol, and mixtures thereof.

6. The aqueous coating material as claimed in claim 1, wherein said hydrophobic amino resin is a hydrophobic melamine resin.

7. The aqueous coating material as claimed in claim 6, wherein said hydrophobic melamine resin is prepared by etherifying a melamine-formaldehyde condensation product with C3 to C12 alcohols.

8. The aqueous coating material as claimed in claim 1, wherein said multi-component aqueous dispersion comprises at least one additional crosslinking component in aqueous dispersion.

9. The aqueous coating material as claimed in claim 8, wherein said additional crosslinking component is a tris-alkoxycarbonylaminotriazine in aqueous dispersion.

10. The aqueous coating material as claimed in claim 1, wherein said hydroxyl-containing binder in the at least one aqueous dispersion of a hydroxyl-containing binder is selected from the group consisting of hydroxyl-containing polyacrylates, polyurethanes, polyesters, polyethers, alkyd resins, and cellulose derivatives and mixtures thereof.

11. The aqueous coating material as claimed in claim 10, wherein said hydroxyl-containing binder in the at least one aqueous dispersion of a hydroxyl-containing binder is a hydroxyl-containing acrylate.

12. A method of applying a multilayer coating to a substrate surface, comprising the following steps:
   (1): applying an aqueous basecoat to a substrate surface,
   (2): forming a basecoat polymer film from the aqueous basecoat,
   (3): applying an aqueous transparent topcoat to the basecoat polymer film and forming a topcoat polymer film, and finally
   (4): baking the basecoat polymer film and the topcoat polymer film together,
wherein said aqueous transparent topcoat is the aqueous coating material as claimed in claim 1.

13. A substrate coated with a multilayer coating, said coating being applied to said substrate surface by
   (1): applying an aqueous basecoat to a substrate surface,
   (2): allowing the aqueous basecoat to evaporate in order to form a basecoat polymer film,
   (3): thereafter, applying an aqueous transparent topcoat to the basecoat polymer film, and allowing the transparent topcoat to evaporate to form a topcoat polymer film, and finally
   (4): baking the basecoat polymer film and the topcoat polymer film together,
wherein said topcoat is the aqueous coating material as claimed in claim 1.

14. An aqueous coating composition comprising a multicomponent aqueous dispersion comprising:
   A) at least one aqueous dispersion of a hydroxyl-containing binder, and
   B) an aqueous dispersion of a hydrophobic amino resin, wherein a hydroxyl-containing emulsifier is attached to the hydrophobic amino resin.

15. The aqueous coating composition of claim 14, wherein said hydroxyl-containing emulsifier is a compound selected from the group consisting of diols, polyols and mixtures thereof.

16. The aqueous coating composition of claim 15, wherein said hydroxyl-containing emulsifier is selected from the group consisting of diols and polyols and mixtures thereof having a molecular weight of at least 500 daltons.

17. The aqueous coating composition of claim 15, wherein said hydroxyl-containing emulsifier is selected from the group consisting of polyurethane-diols, polyurethane-polyols, polyacrylate-diols, polyacrylate-polyols, polyester-diols, polyester-polyols, polyether-diols, polyether-polyols, and mixtures thereof.

18. The aqueous coating composition of claim 14, wherein the hydroxyl-containing emulsifier is selected from the group consisting of a polyurethane-diol, polyurethane-polyol, a polycarbonate-diol, polycarbonate-polyol, a polyether-diol, polyether-polyol, and mixtures thereof.

19. The aqueous coating composition of claim 14, wherein said hydrophobic amino resin is a hydrophobic melamine resin.

20. The aqueous coating composition of claim 19, wherein said hydrophobic melamine resin is prepared by etherifying a melamine-formaldehyde condensation product with $C_3$ to $C_{12}$ alcohols.

21. The aqueous coating composition of claim 14, wherein said multi-component aqueous dispersion comprises at least one additional crosslinking component in aqueous dispersion.

22. The aqueous coating composition of claim 21, wherein said additional crosslinking component is a tris-alkoxycarbonylaminotriazine in aqueous dispersion.

23. The aqueous coating composition of claim 14, wherein said hydroxyl-containing binder in the at least one aqueous dispersion of a hydroxyl-containing binder is selected from the group consisting of hydroxyl-containing polyacrylates, polyurethanes, polyesters, polyethers, alkyd resins, and cellulose derivatives and mixtures thereof.

24. The aqueous coating composition of claim 23, wherein said hydroxyl-containing binder in the at least one aqueous dispersion of a hydroxyl-containing binder is a hydroxyl-containing acrylate.

25. The aqueous coating composition of claim 14, wherein the aqueous coating composition is at least one of a basecoat and a clearcoat.

26. A method of applying a multilayer coating to a substrate surface, comprising the following steps:
   (1): applying an aqueous basecoat to a substrate surface,
   (2): forming a basecoat polymer film from the aqueous basecoat,
   (3): applying an aqueous transparent topcoat to the basecoat polymer film and forming a topcoat polymer film, and finally
   (4): baking the basecoat polymer film and the topcoat polymer film together,
wherein said aqueous transparent topcoat is the aqueous coating composition of claim 14.

27. A substrate coated with a multilayer coating, said coating being applied to said substrate surface by
   (1): applying an aqueous basecoat to a substrate surface,
   (2): allowing the aqueous basecoat to evaporate in order to form a basecoat polymer film,
   (3): thereafter, applying an aqueous transparent topcoat to the basecoat polymer film, and allowing the transparent topcoat to evaporate to form a topcoat polymer film, and finally
   (4): baking the basecoat polymer film and the topcoat polymer film together,
wherein said topcoat is the aqueous coating composition of claim 14.

* * * * *